(12) United States Patent
Whitacre et al.

(10) Patent No.: US 8,109,528 B2
(45) Date of Patent: *Feb. 7, 2012

(54) SERVICE LOAD BEARING ASSEMBLY FOR SPREADING OUT HIGH INDUCED STRESSES

(75) Inventors: Donald Whitacre, Ann Arbor, MI (US); Zhiyou Xu, Ann Arbor, MI (US)

(73) Assignee: Automotive Casting Technology, Inc., Franklin, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,105

(22) Filed: Feb. 16, 2011

(65) Prior Publication Data
US 2011/0204587 A1    Aug. 25, 2011

Related U.S. Application Data

(63) Continuation of application No. 12/280,511, filed as application No. PCT/US2007/024212 on Nov. 19, 2007, now Pat. No. 7,914,021.

(60) Provisional application No. 60/866,347, filed on Nov. 17, 2006.

(51) Int. Cl.
B60G 7/02    (2006.01)
(52) U.S. Cl. ................................................. 280/86.756
(58) Field of Classification Search ............... 280/124.1, 280/124.132–124.134, 86.756, 5.523
See application file for complete search history.

(56) References Cited

U.S. PATENT DOCUMENTS 7,703,782 B2 *    4/2010    Kiselis et al. .......... 280/124.133
* cited by examiner

*Primary Examiner* — Faye M. Fleming
(74) *Attorney, Agent, or Firm* — Brian S. Boyer; Syndacated Law

(57) ABSTRACT

Embodiments of the present invention provide a suspension assembly including a bolt made from a bolt material; a suspension component made from a suspension material, the suspension component having a suspension opening therethrough, the suspension opening having a geometry for insertion of at least a first portion of the bolt; and a bushing assembly including an elastomeric element and a bushing opening therethrough, the bushing opening having a geometry for insertion of at least a second portion of the bolt; wherein the suspension material has a yield strength that is substantially higher than a yield strength of the bolt material.

24 Claims, 13 Drawing Sheets

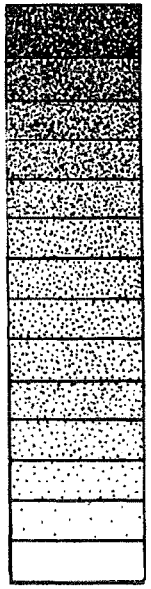
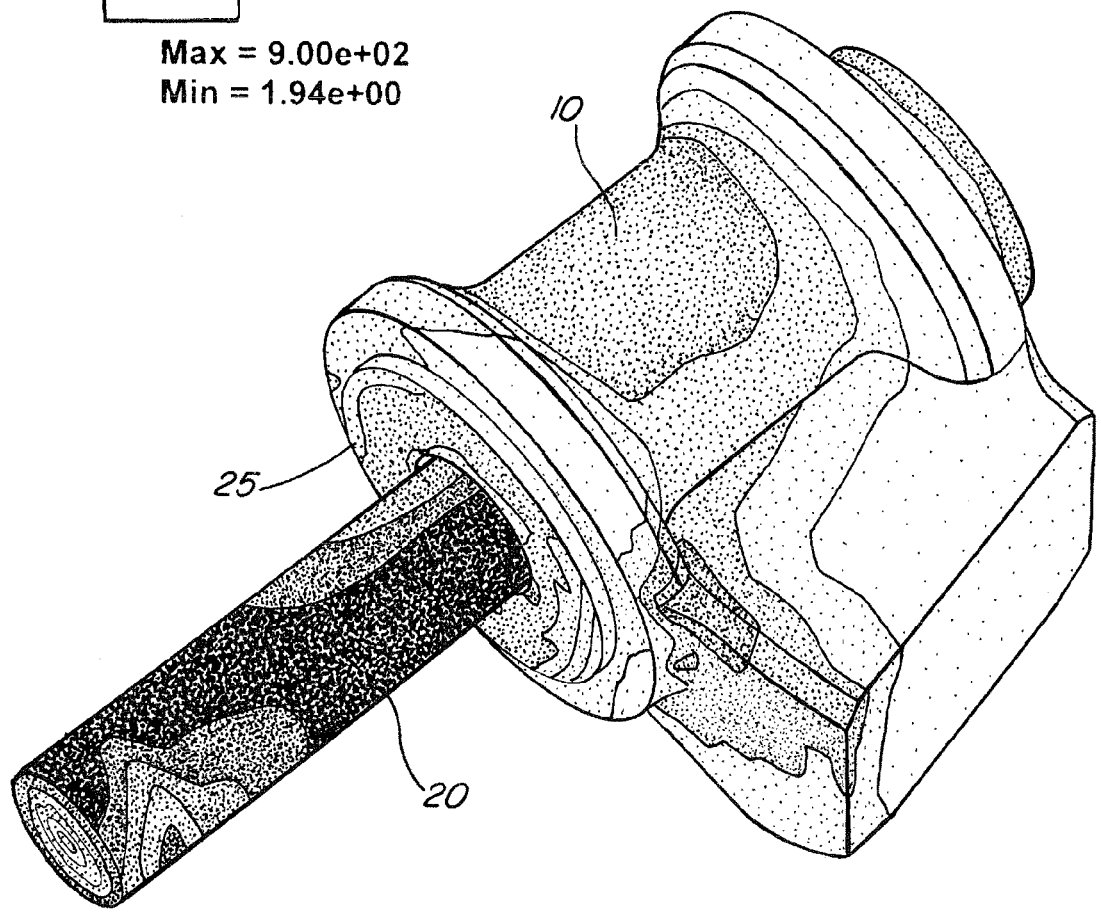
FIG. 5

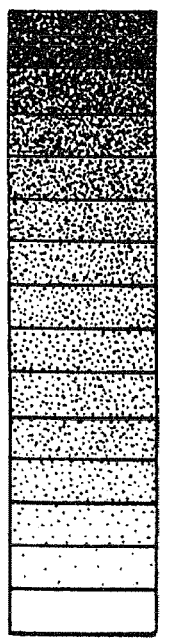
Max = 9.00e+02
Min = 1.94e+00
FIG. 6
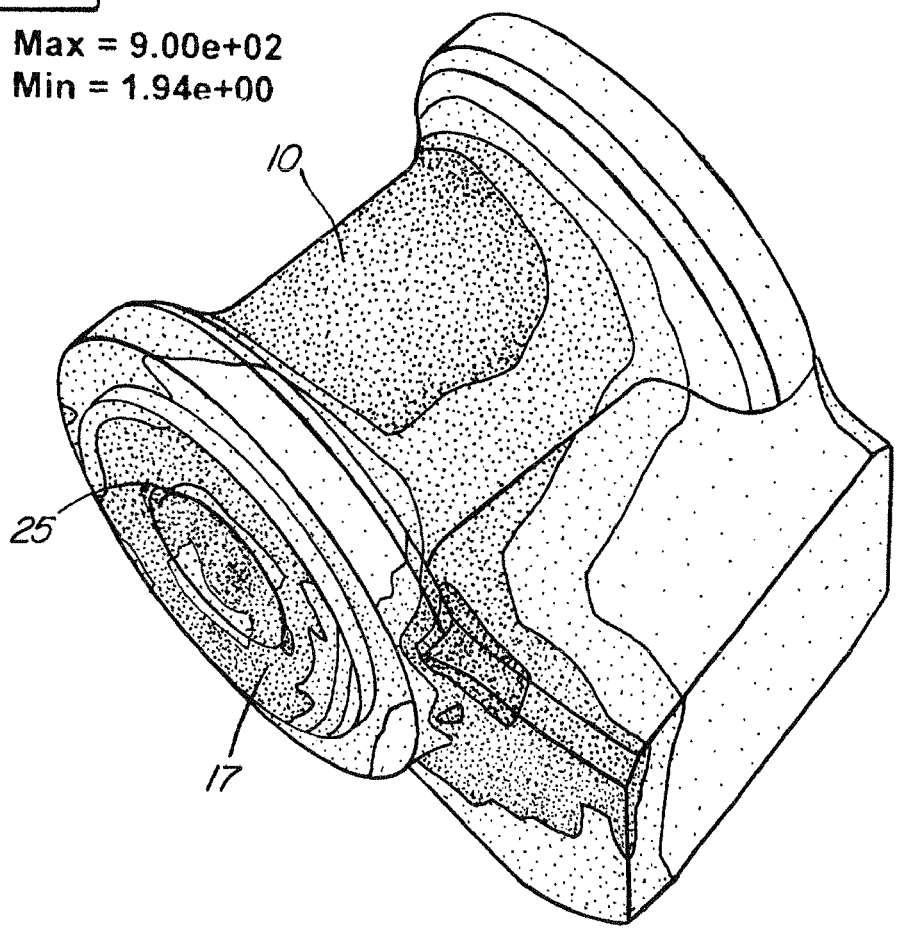

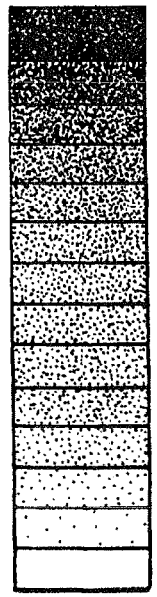
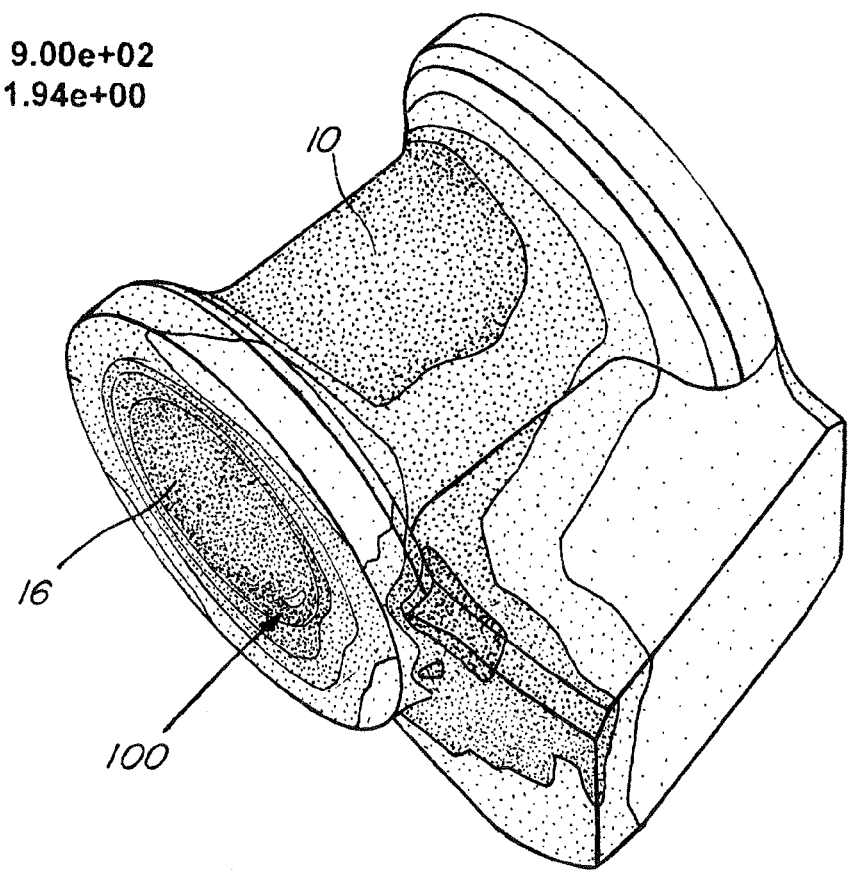
FIG. 7

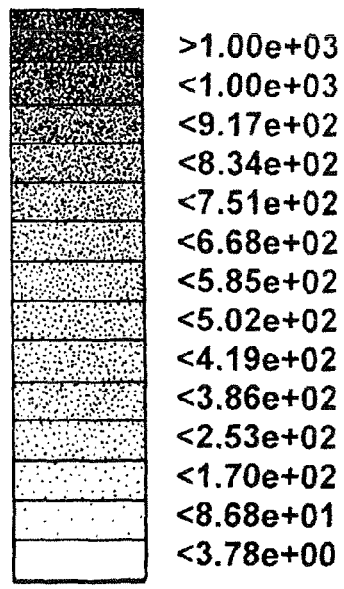
Max = 1.61e+03
Min = 3.78e+00
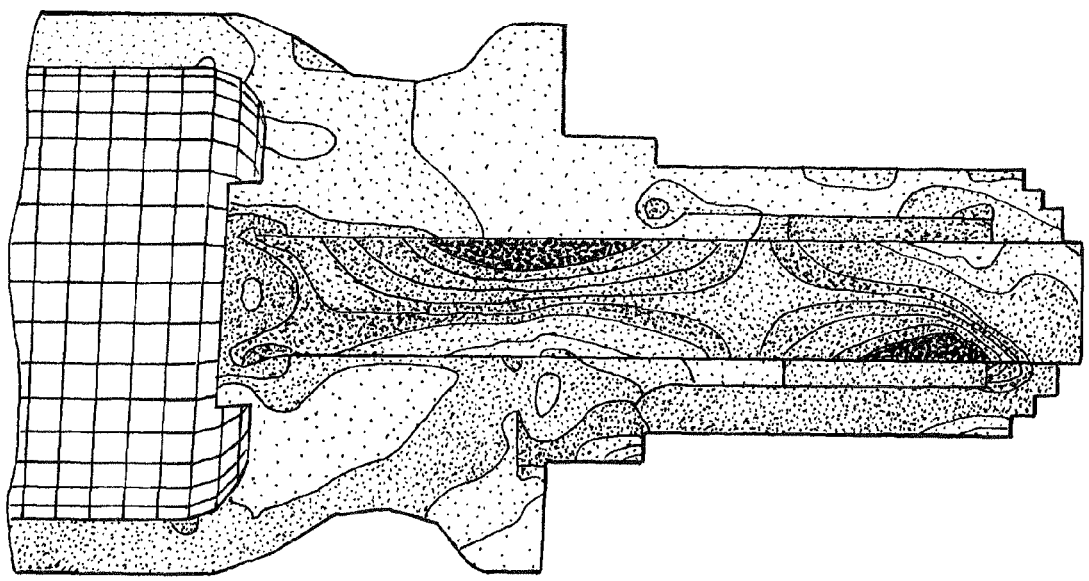
FIG. 9

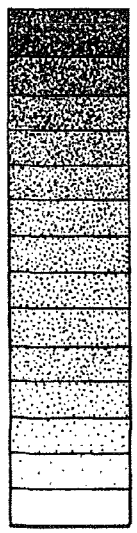
```
>8.00e+02
<8.00e+02
<7.34e+02
<6.67e+02
<6.01e+02
<5.34e+02
<4.68e+02
<4.02e+02
<3.35e+02
<2.69e+02
<2.03e+02
<1.36e+02
<6.99e=01
<3.49e+00
```
Max = 8.76e+02
Min = 3.49e+00
FIG. 11
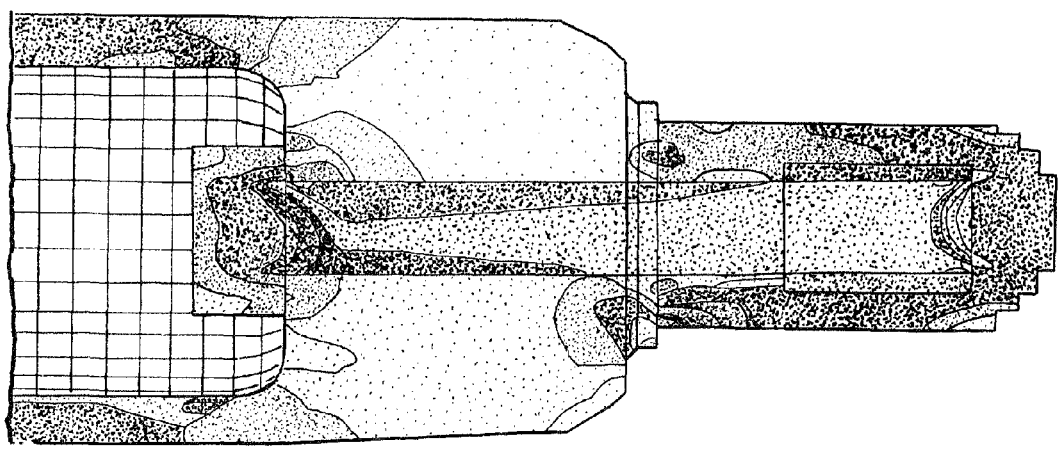

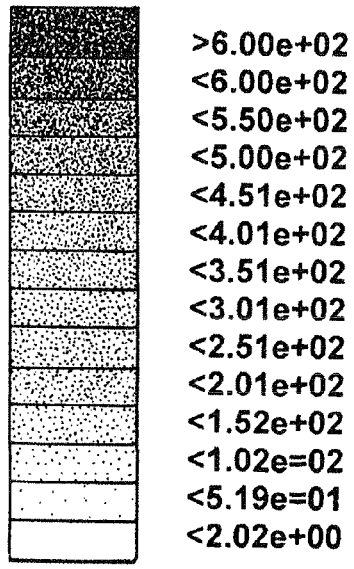
FIG. 13
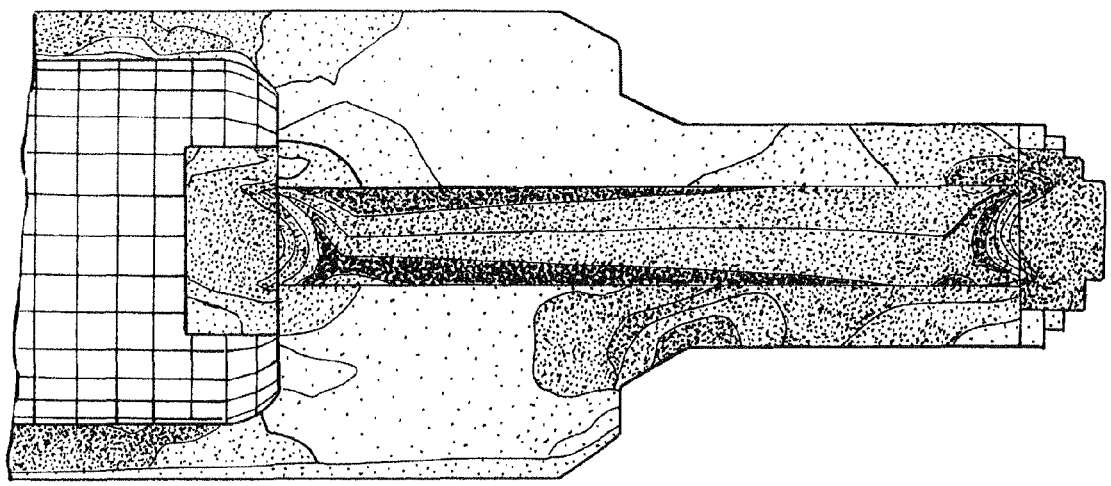

SERVICE LOAD BEARING ASSEMBLY FOR SPREADING OUT HIGH INDUCED STRESSES

CROSS-REFERENCES TO RELATED APPLICATIONS

This application is a continuation of U.S. application Ser. No. 12/280,511, filed Aug. 22, 2008 now U.S. Pat. No. 7,914,021, which is the National Stage of International Application No. PCT/US07/24212, filed Nov. 19, 2007, which claims the benefit of U.S. Provisional Application No. 60/866,347, filed Nov. 17, 2006, each application of which is hereby incorporated herein by reference in its entirety.

FIELD OF THE INVENTION

The embodiments disclosed herein relate generally to the field of suspension systems for vehicles, and more particularly to an offset bushing mounting apparatus for use in the suspension systems of vehicles.

BACKGROUND OF THE INVENTION

Suspension systems making use of elastomeric members or bushings between a generally fixed portion of the frame of the vehicle and an end of a shock absorber, strut, or other type of cylinder or suspension member are generally well known within the art.

Elastomeric bushings are generally used to reduce transmitted road noise and suspension vibration, and are also generally flexible enough to allow for articulation or movement during suspension travel. Typically, a suspension arm includes at least one elastomeric bushing pivotably attached to the vehicle frame.

In some car and light truck suspensions, tight clearances between the wheel or other components and suspension components require bushings that are offset or cantilevered from the suspension component. Typically, the geometric relationship of the cantilevered bushing to the suspension component induces high bending moments on the interface of the bushing and the suspension component during vehicle service. More specifically, service loads induce high bending moments, and subsequently high local stresses, in the portion of the suspension components connected to the bushing. Referring to FIG. 1, a force F of 33.2 kN to an offset bushing, as typically experienced in automotive or light truck applications, results in a stress of greater than 600 MPa being induced to the suspension component 10 at the point of connectivity 100 to the offset bushing. These high local stresses require that the suspension component 10 be constructed from high strength materials, i.e. forged steel, which precludes the use of lightweight materials, i.e. cast aluminum. By precluding the use of lightweight materials, the weight of heavier prior offset bushing designs disadvantageously limit the fuel economy and handling of the vehicle.

In light of the above, a need exists for an offset bushing design incorporated into lightweight suspension components, such as cast aluminum suspension components.

SUMMARY OF THE INVENTION

Embodiments of the present invention may overcome the drawbacks associated with the prior art by providing a lightweight suspension component having an offset bushing assembly. Systems and methods for providing a lightweight suspension component having an offset bushing assembly are disclosed herein. According to aspects illustrated herein, there is provided a suspension assembly including a bolt made from a bolt material; a suspension component made from a suspension material, the suspension component having a suspension opening therethrough, the suspension opening having a geometry for insertion of at least a first portion of the bolt; and a bushing assembly including an elastomeric element and a bushing opening therethrough, the bushing opening having a geometry for insertion of at least a second portion of the bolt; wherein the suspension material has a yield strength that is substantially higher than a yield strength of the bolt material.

According to aspects illustrated herein, there is provided a suspension assembly including a suspension component including at least one substantially cylindrical cavity positioned at one end of the suspension component, the cylindrical cavity providing for attachment to a vehicle frame and having a bore at one end of the cylindrical cavity; a stud positioned centrally in the at least one substantially cylindrical cavity, the stud having a head opposed to enlarged bore of the cylindrical cavity of the suspension component and providing the pivot axis of the suspension component to a vehicle frame; a hardened sleeve in a pressed interference-fit engagement to the enlarged bore of the cylindrical cavity; a bushing assembly including an elastomeric element having a core with a centrally positioned hollow, wherein the hollow of the core has a geometry for insertion of the stud; and a fastener in engagement to the stud, wherein the core is positioned between the fastener and the hardened sleeve.

According to aspects illustrated herein, there is provided a method of manufacturing a suspension assembly including providing a suspension component including at least one cavity positioned at one end of the suspension component, the at least one cavity providing for attachment to a vehicle frame, the at least one cavity having an enlarged bore at one end thereof; positioning a stud in the at least one cavity of the suspension component, the stud having a head in contact with a portion of the suspension component opposed to the enlarged bore of the at least one cavity of the suspension component; positioning a sleeve over the stud and adjacent to the enlarged bore of the at least one cavity of the suspension component; positioning a bushing assembly having an elastomeric element with a core, the core having a first end, a second end and a hollow, wherein the stud is positioned within the hollow of the bushing assembly and the first end of core is adjacent to the sleeve; and engaging a fastener adjacent to the second end of the core and in threaded connection to the stud, wherein full engagement of the fastener further presses the sleeve into the enlarged bore of the at least one cavity and clamps the core of the bushing to the sleeve.

Various embodiments provide certain advantages. Not all embodiments of the invention share the same advantages and those that do may not share them under all circumstances. Further features and advantages of the embodiments, as well as the structure of various embodiments are described in detail below with reference to the accompanying drawings.

BRIEF DESCRIPTION OF THE DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

FIG. 5 is a stress diagram of all illustrative embodiment of an offset bushing and suspension component;

FIG. 6 is a stress diagram of an illustrative embodiment of an offset bushing and suspension component;

FIG. 7 is a stress diagram of an illustrative embodiment of an offset bushing and suspension component;

FIG. 9 is a stress diagram of the offset suspension bushing of FIG. 8;

FIG. 11 is a stress diagram of the offset suspension bushing of FIG. 10;

Figure 1:
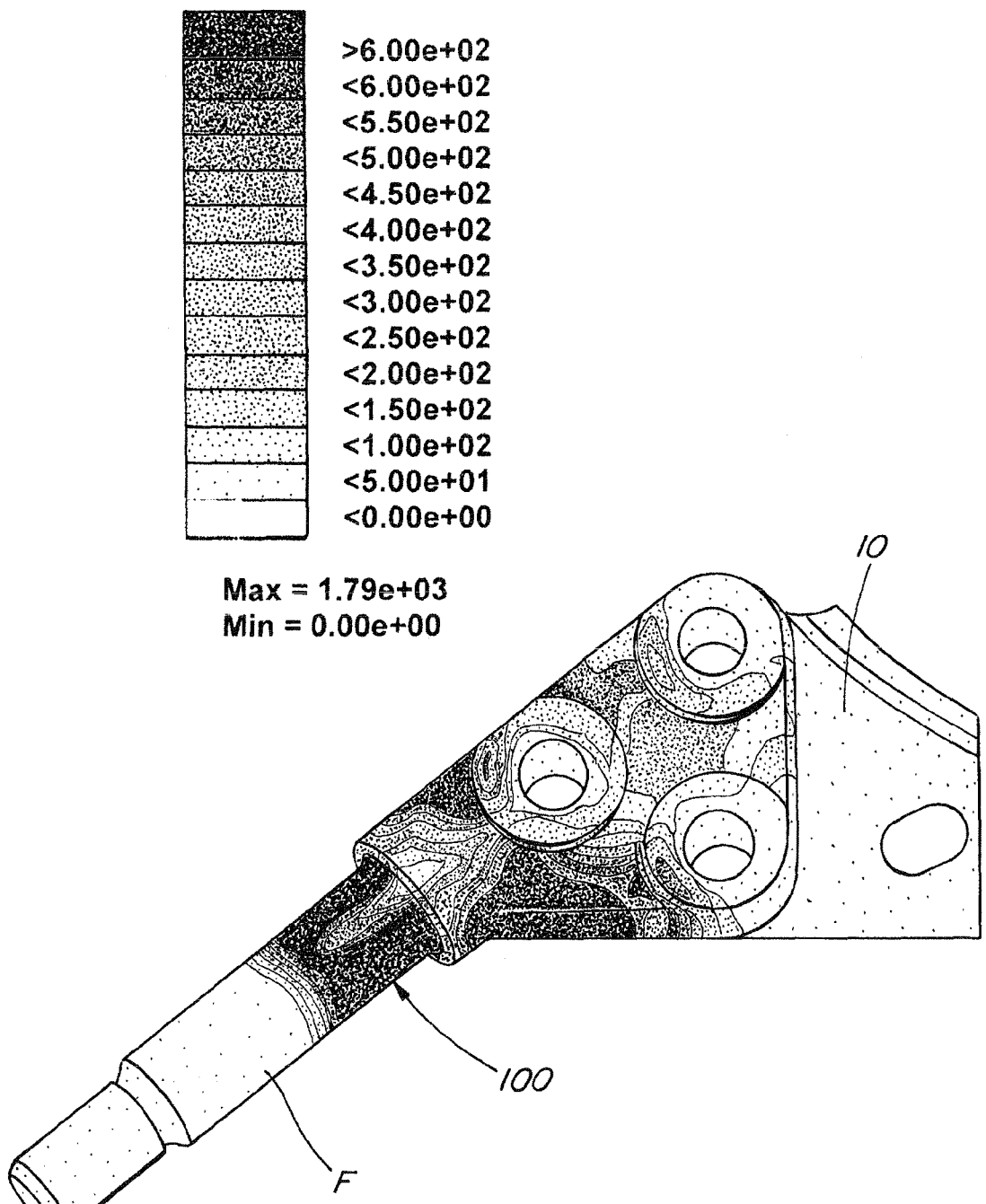
FIG. 1 is a stress diagram of an illustrative embodiment of a prior suspension component having a prior offset bushing design.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE DRAWINGS

The inventions are not limited in its application to the details of construction and the arrangement of components set forth in the following description or illustrated in the drawings. The inventions are capable of being arranged in other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Aspects of the inventions are described below with reference to illustrative embodiments. It should be understood that reference to these illustrative embodiments is not made to limit aspects of the inventions in any way. Instead, illustrative embodiments are used to aid in the description and understanding of various aspects of the inventions. Therefore, the following description is intended to be illustrative, not limiting.

Figure 2:
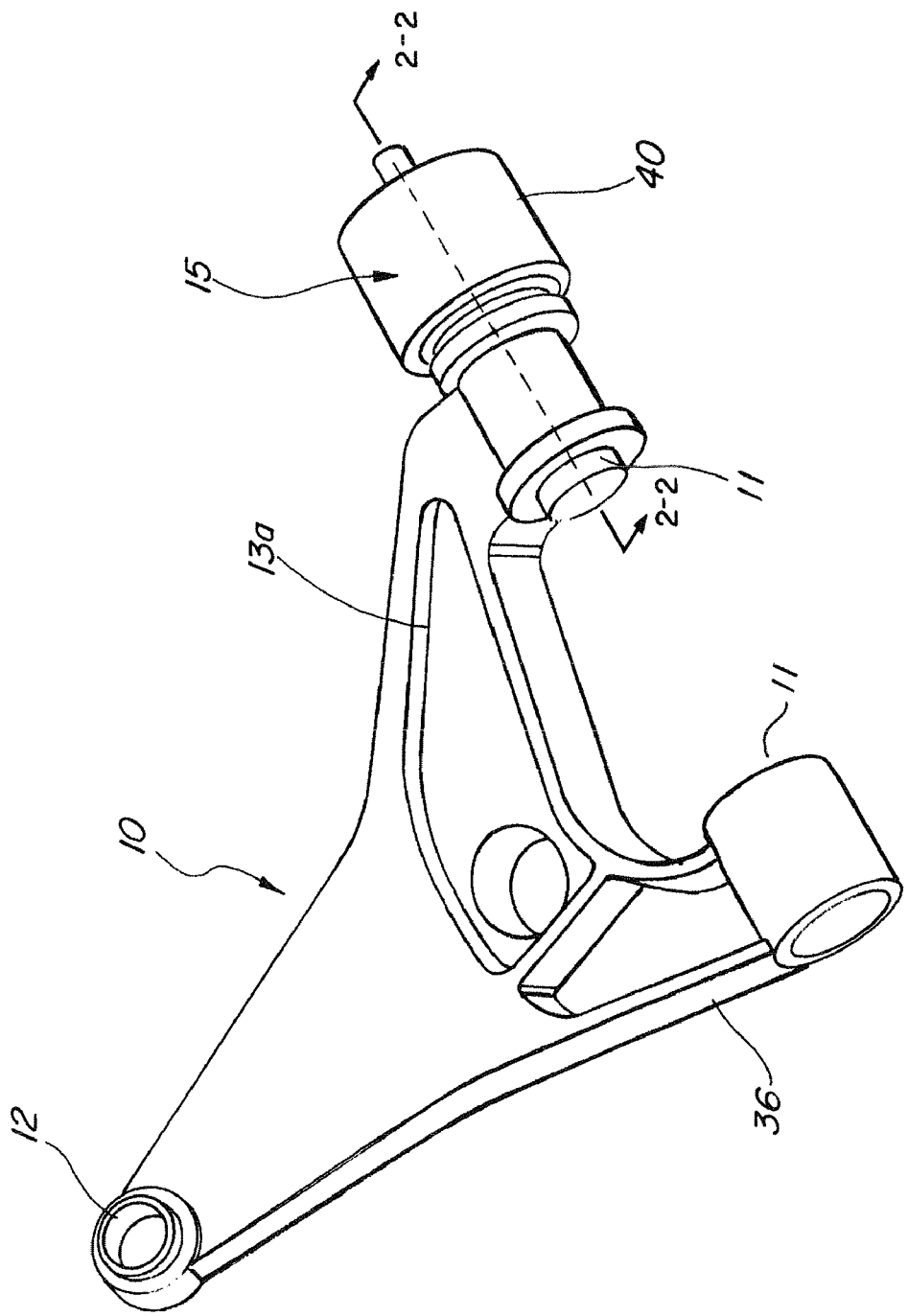
FIG. 2 is a perspective view of an illustrative embodiment of a suspension component having an offset bushing assembly.

Embodiments of the present invention are directed to a disposable apparatus. As shown in the embodiment of FIG. 2, a suspension component 10 may have an offset bushing assembly 15. The suspension component 10 may be a triangular A-arm configuration in which one end, forming the vertex 12 of the triangle, may provide for engagement to a ball joint or equivalent structure, and may further include two suspension legs 13a, 13b extending from the vertex 12 of the suspension component 10 and may provide for a pivoting engagement to a vehicle frame (not shown). The pivoting engagement may be provided by cavities 11, having a substantially cylindrical configuration, formed through the portion of the suspension legs 13a, 13b attached to the vehicle frame in combination with bushings connected to the cavities 11, wherein at least one bushing may be an offset bushing assembly 15. In some embodiments, a first suspension leg 13a may be connected to the vehicle frame by an offset bushing assembly 15, and the second suspension leg 13b may be connected to the vehicle frame by a conventional bushing assembly, in which the conventional bushing may fit within the cavity 11.

Although the suspension component 10 is depicted as having the configuration of a triangular A-arm, the suspension component 10 may be any suspension member that is utilized in automotive applications including but not limited to: swing arm, control arm, drag link, differential link, camber link, lateral link, trailing arm, strut rod, trailing arm, tie rod, knuckle, wheel carrier, subframe, axle carrier, crossmember, subframe and toe rods. In addition, the suspension component may be used on any vehicle, including but not limited to an automobile, truck, semi, bus, van, minivan, sports utility vehicle (SUV), motorcycle, bicycle, scooter, carriage, train, boat, ship, submarine, amphibious vehicle, all-terrain vehicle (ATV), aeroplane, rotorcraft, or any other device or structure for transporting persons or things. Not all embodiments of the present invention are intended to be limited in these respects.

The suspension component 10 may be composed of a lightweight material. Using a lightweight material may contribute to increasing at least one of the performance and fuel economy of the vehicle. The suspension component 10 may be composed of an aluminum alloy, for example, Aluminum Association A356. In some embodiments, the aluminum alloy may be composed of from about 6.5 wt. % to about 7.5 wt. % Al, less than 0.20 wt. % Fe, less than 0.20 wt. % Cu, less than 0.10 wt. % Mn, from about 0.25 wt. % to about 0.45 wt. % Mg, less than 0.10 wt. % Zn, less than 0.20 wt. % Ti, and a balance of Al and incidental impurities. Incidental impurities may include any contamination of the melt, including leaching of elements from the casting apparatus. Allowable ranges of impurities may be less than 0.05 wt. % for each impurity constituent and 0.15 wt. % for total impurity content. In some embodiments, the casting may be heat treated to a T5 or T6 temper. In some embodiments, the temper may be a T6 temper.

The suspension component may be cast using permanent mold casting technology, sand casting technology, or a Vacuum Riserless Casting (VRC)/Pressure Riserless Casting (PRC). The Vacuum Riserless Casting (VRC)/Pressure Riserless Casting (PRC) process may be suitable for mass production of high integrity aluminum automotive suspension components. VRC/PRC is a low pressure casting process, in which in some embodiments the pressure may be on the order of 6.0 Psi. In some embodiments the pressure may be between approximately 3.5 Psi and approximately 8.5 Psi, may be less than 6.0 Psi or may be greater than 6.0 Psi as not all embodiments of the present invention are intended to be limited in this respect. In VRC/PRC, a mold may be positioned over a hermetically sealed furnace and the casting cavity may be connected to the melt by feed tubes. Melt may be drawn into the mold cavity by applying a pressure to the furnace through the application of an inert gas, such as Argon. A constant melt level may be maintained in the furnace of the VRC/PRC apparatus, which may assist in avoiding back-surges that are sometimes experienced in a more traditional low-pressure system.

Multiple fill tubes (stalks) may provide for metal distribution in the mold cavity. Multiple fill points combined with close coupling between the mold and melt surface may allow for lower metal temperatures, may minimize hydrogen and oxide contamination and/or may provide maximum feeding of shrinkage-prone areas in the casting. The multiple fill tubes may also allow multiple yet independent cavities in a mold. Carefully sequenced thermal controls may quickly solidify castings from extreme back to fill tubes, which may then function as feed risers.

The suspension component may be a hollow casting. Although, in some embodiments, the suspension component 10 may be cast, the suspension component may be formed or forged.

Figure 3:
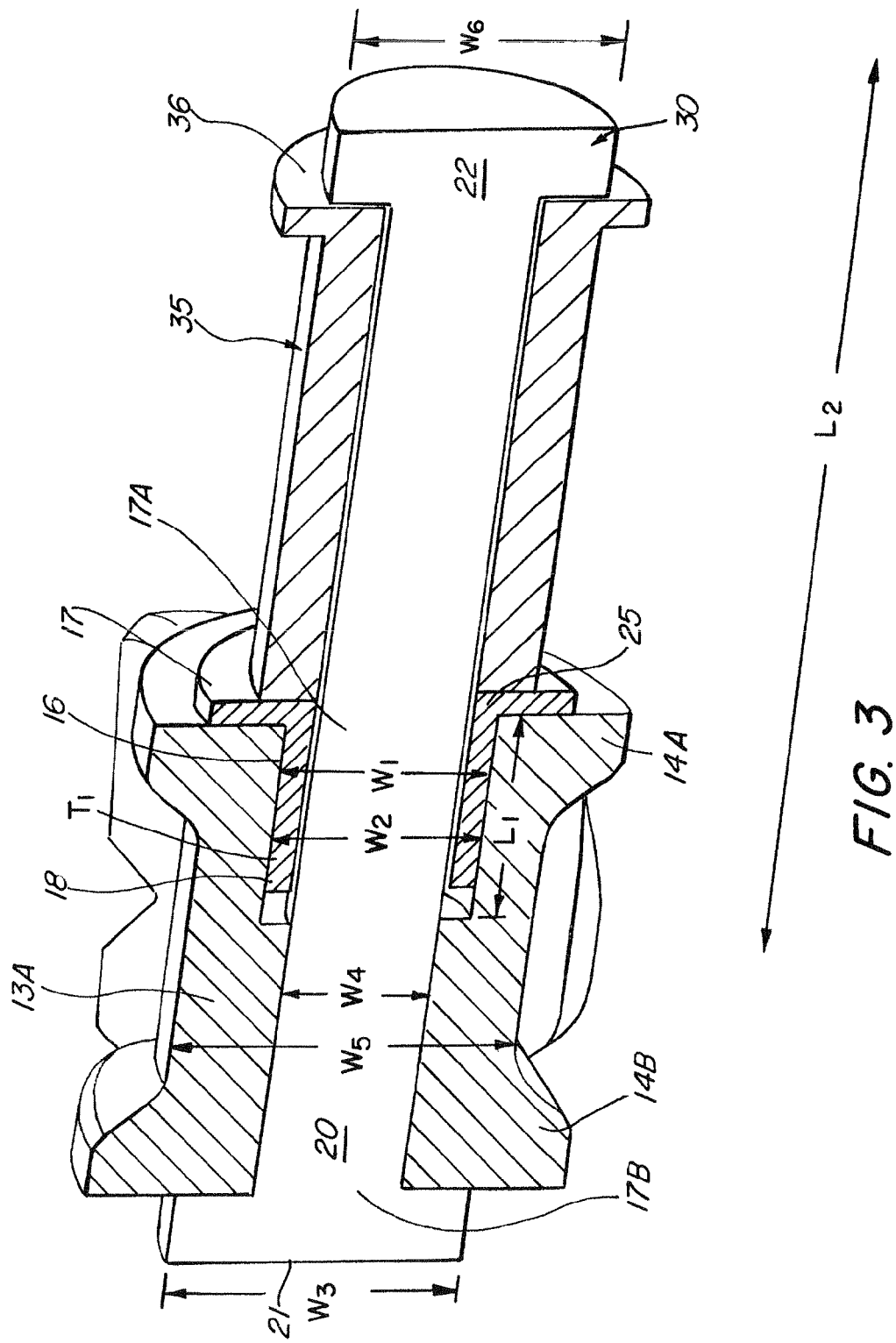
FIG. 3 is a cross-sectional view of an illustrative embodiment taken along section line 2-2 of the offset bushing depicted in FIG. 2.

The embodiment depicted in FIG. 3 shows a cross sectional view of along section line 2-2 of the offset bushing assembly 15 connected to the first suspension leg 13a, as depicted in the embodiment shown in FIG. 2. The cavity in the first suspension leg 13a may further include an enlarged bore 16. The enlarged bore 16 may have a width W1 and length L1 dimension which may provide for a frictional and/or Interference-fit engagement to the hardened sleeve 25 of the offset bushing assembly 15. In some embodiments, a hardened sleeve may have a strength which is greater than a normal material by subsequent processing in an attempt to increase wear and resist higher stresses without failure.

In some embodiments, the enlarged bore 16 may be machined into the cavity 16 of the first suspension leg 13a. The portion of the suspension component 10 corresponding to the cavity 11 may have a first flange 14a corresponding to a first opening 17a of the cavity 11 having the enlarged bore 16, and a second flange 14b corresponding to a second opening 17b of the cylindrical cavity 11 that is opposed to the enlarged bore 16. The first and second flanges 14a, 14b may strengthen the portion of the suspension component 10 corresponding to the cavity 11 and may provide sufficient area to react to loads of head portion 21 of the stud 20 and lateral rim portion of the hardened steel sleeve 25 and in some embodiments, react without deformation.

Referring to FIG. 2 and FIG. 3, in one embodiment, the offset bearing assembly 15 includes a stud 20, a sleeve 25, a fastener 30, and a bushing assembly including an elastomeric element 40. Referring to FIG. 3, the stud 20 may be formed from hardened steel and may include a head portion 21 and a threaded portion 22. The head portion 21 has a width W3 greater than the width W4 of the first opening 17a, wherein the width of the first opening 17a is substantially equal to provide an interference fit to the width of the cylindrical cavity 11 prior to the enlarged bore 16. The threaded portion 22 may extend a portion of the longitudinal length L2 of the stud 20 or may be positioned only to correspond with the threaded fastener 30.

The sleeve 25 may be composed, such as by forming or casting, of a material having a higher hardness than the suspension component 10. In some embodiments, this material may be hardened steel. The sleeve 25 may have a width for frictional engagement of the exterior surface of the longitudinal body portion 18 of the hardened sleeve 25 to the interior surface of the enlarged bore 16 in a pressed interference-fit engagement. Specifically, the properties of the pressed engagement may be enhanced by selecting the width of $W_1$ of the enlarged portion 16 of the cavity, the width $W_2$ of the hardened sleeve 25, the wall thickness T1 of the hardened sleeve 25, and the thickness of W5 of the suspension leg 13 to provide a compressive force induced by the interior surface of the enlarged portion 16 of the cavity 11. This compressive force is the mechanism that provides the sufficient normal force to frictionally engage hardened sleeve 25 and enlarged portion 16 of cavity 11.

In some embodiments, choosing a material which is harder or has a higher yield strength for a first part, such as the stud and/or bolt, may enable a lower strength and/or lighter weight material to be used for another part, such as the boss or suspension component. The yield strength or yield point of a material is the stress at which the material begins to deform plastically. Prior to the yield point, a material may deform elastically and will return to its original shape when an applied stress is removed. Once the yield point of a material is passed, some fraction of deformation will be permanent and non-reversible. A material's yield point may be defined as the material's true elastic limit, e.g., the lowest stress at which dislocations move, as the material's proportionally limit, e.g., the point at which the stress-strain cure deviates from Hooke's law (i.e., becomes non-linear), as the material's elastic limit, e.g., the lowest stress at which permanent deformation may be measured, as the material's offset yield point (yield strength or proof stress), e.g., the point on the stress strain curve, typically defined by a plastic strain of 0.2%, and/or as the material's upper and/or lower yield points, e.g., the point at which the material reaches an upper yield point before dropping rapidly to a lower yield point, wherein the material response may be linear up until the upper yield point, but the lower yield point may be used in structural engineering as a conservative value.

In some embodiments, the boss or suspension component may be made from a first material and the stud or bolt may be made from a second material. The second material may have a yield strength that is substantially higher than the yield strength of the first material. In some embodiments, the second material may have a yield strength that is two or three times higher than the yield strength of the first material. In some embodiments, the second material may have a yield strength that is more than three times higher than the yield strength of the first material. In some embodiments, the first material may have a yield strength of approximately 200 MPa. In some embodiments, the yield strength of the first material may range from approximately 100 MPa to approximately 300 MPa. The yield strength of the first material may be less than 100 MPa or may be greater than 300 MPa, as not all embodiments of the present invention are intended to be limited in this respect. In some embodiments, the second material may have a yield strength of approximately 800 MPa. In some embodiments, the yield strength of the second material may range from approximately 600 MPa to approximately 800 MPa and/or from approximately 800 MPa to approximately 1000 MPa. The yield strength of the second material may be less than 600 MPa or may be greater than 1000 MPa, as not all embodiments of the present invention are intended to be limited in this respect. In some embodiments, the second material may include steel or titanium or any other material having a higher yield strength than the first material, which may include, but is not limited to, aluminum or magnesium alloys, or a lower strength steel or iron.

It should be appreciated that in some embodiments, some of the components or parts of the bushing suspension may be made from a higher or lower yield strength materials, as not all embodiments of the present invention are intended to be limited in this respect.

The longitudinal body 18 portion may have dimensions for insertion of the hardened sleeve 25 within the enlarged bore 16 of the cavity 11. The hardened sleeve 25 may further include a lateral rim portion 17 extending along an exterior surface of the first flange 14a of the suspension component 10. The lateral rim 17 may facilitate distribution of the load stresses induced in the bushing assembly during service to the suspension component 10 in a uniform manner.

In one embodiment, the bushing assembly may include an elastomeric element 40 having a rigid core 35 with a centrally positioned hollow. The elastomeric element may be provided by a polyurethane or rubber bushing. In some embodiments, the elastomeric element may be provided by a hydraulic bushing. The hydraulic bushing may include a polyurethane or rubber skin encasing hydraulic oil. Hydraulic bushings may be tuned for a specific frequency and provide increased damping at the tuned frequency. Compared to a much stiffer conventional bushing, a hydraulic bushing may provide a lower spring rate for improved isolation but much higher damping for adequate control. A hydraulic bushing may produce high damping as a result of the transfer of fluid from one chamber to another. The fluid may pass through a channel called the inertia track. The inertia track can be 'tuned' to provide damping at a specific frequency. It should be appreciated that any bushing, such as solid bushings, may be utilized.

The rigid core 35 may be provided by a lightweight material, such as aluminum, having sufficient wall thickness to provide structural rigidity. The hollow that is centrally positioned has a width sufficient for insertion of the stud 20. In some embodiments, a core flange 36 may be provided at the end of the rigid core 35 that is opposite the hardened sleeve 25 and engaged by the fastener 30. The core flange 36 may reinforce the site at which the fastener 30 engages the rigid core 35 in order to clamp it against the hardened sleeve 25 in frictional and interference-fit engagement to the enlarged bore 16 of the cavity 11.

The fastener 30 positioned at the end of the rigid core 35 opposite the hardened sleeve 25 may be engaged to the stud 20 in communicating threaded engagement. The fastener 30 may have a width $W_6$ that is sufficiently greater than the width of the hollow centrally positioned in the rigid core 35. Torquing the fastener 30 into contact with the core flange 36 may induce a force on the sleeve 25 through the contact of the rigid core 35 to the lateral rim portion 17 of the sleeve 25, wherein continued torquing of the fastener 30 towards the cavity 11 of suspension component 10 may further press the hardened sleeve 25 into frictional engagement with the enlarged bore. In some embodiments, the fastener 30 may be composed of a hardened steel or another high yield strength material.

In another aspect of the present invention, a method of forming a suspension component assembly having an offset bushing is provided. The method may include the steps of providing a suspension component 10 including at least one substantially cylindrical cavity 11 positioned at one end of the suspension component 10, the cylindrical cavity 11 providing for attachment to a vehicle frame and having an enlarged bore 16 at one end of the cylindrical cavity 11; positioning a stud 20 centrally in the at least one substantially cylindrical cavity 11 of the suspension component 10, the stud 20 having a head 21 in contact with a portion of the suspension component 10 opposed to enlarged bore of the cylindrical cavity 11 of the suspension component; positioning a hardened sleeve 25 over the stud 20 and adjacent to the enlarged bore 16 of the cylindrical cavity of the suspension component 10; positioning a bushing assembly having an elastomeric element 15 with a rigid core, the rigid core 35 having a first end, a second end and a centrally positioned hollow, wherein the stud 20 is positioned within the centrally positioned hollow of the bushing assembly 15 and the first end of rigid core 35 is adjacent to the hardened sleeve 25; and engaging a fastener 30 adjacent to the second end of the rigid core 35 and in threaded connection to the stud, wherein full engagement of the fastener 30, clamps the rigid core 35 of the elastomeric element 15 to the hardened sleeve 25, further pressing the hardened sleeve 25 into the enlarged bore 16 of the cylindrical cavity 11.

In one embodiment, a suspension assembly includes a suspension component including at least one substantially cylindrical cavity positioned at one end of the suspension component, the cylindrical cavity providing for attachment to a vehicle frame and having an enlarged bore at one end of the cylindrical cavity; a stud positioned centrally in the at least one substantially cylindrical cavity, the stud having a head opposed to enlarged bore of the cylindrical cavity of the suspension component and providing the pivot axis of the suspension component to a vehicle frame; a hardened sleeve in a pressed engagement to the enlarged bore of the cylindrical cavity; a bushing assembly including an elastomeric element having a rigid core with a centrally positioned hollow, wherein the hollow of the rigid core has a geometry for insertion of the stud; and a fastener in engagement to the stud, wherein the rigid core is positioned between the fastener and the hardened sleeve.

In some embodiments, the suspension component may be cast from a lightweight and/or lower yield strength material, such as an aluminum alloy, and at least one of the stud and the hardened sleeve may be formed of steel or a higher yield strength material. The hardened sleeve may provide a relatively high strength material that uniformly distributes the service loads induced to the offset bushing to the lightweight cast suspension component.

In some embodiments, the suspension component may include an aluminum alloy. In some embodiments, the suspension component may include at least one of a swing arm, a control arm, a drag link, a differential link, a camber link, a lateral link, a trailing arm, a strut rod, a trailing arm, a tie rod, a knuckle, a wheel carrier, a subframe, an axle carrier, a crossmember, a subframe and a toe rod. In some embodiments, the suspension component may have an A-arm configuration, having at least two cylindrical cavities providing for attachment to a vehicle frame. In some embodiments, the hardened sleeve may include steel. In some embodiments, the core of the bushing assembly may be a rigid core and may include steel. In some embodiments, the rigid core may include an enlarged flange positioned adjacent to the fastener.

In some embodiments, the end of the suspension component having the substantially cylindrical cavity may have a first flange corresponding to a first opening of the cylindrical cavity having the enlarged bore and a second flange to a second opening of the cylindrical cavity opposed to the enlarged bore. In some embodiments, the hardened sleeve may include a longitudinal body portion and a lateral rim portion; the longitudinal portion may have dimensions for insertion to the enlarged bore of the cylindrical cavity and the lateral rim portion may extend along an exterior surface of the first flange of the suspension component. In some embodiments, the hardened sleeve may uniformly distribute service loads induced to the bushing assembly to the suspension component. In some embodiments, the elastomeric element may be a hydraulic bushing. In some embodiments, the elastomeric element may include polyurethane, rubber or a combination thereof. In some embodiments, the stud may include steel.

Some embodiments of the suspension assembly of the present invention may provide for a more uniform distribution of the bending stresses in the main body of the suspension component 10 generated by an offset bushing configuration than were previously possible in prior offset bushing configurations. In some embodiments, the hardened sleeve 25 may more uniformly distribute highly concentrated stresses at the pivot axis of the bushing assembly to the lower-strength material of the suspension component.

Figure 4:
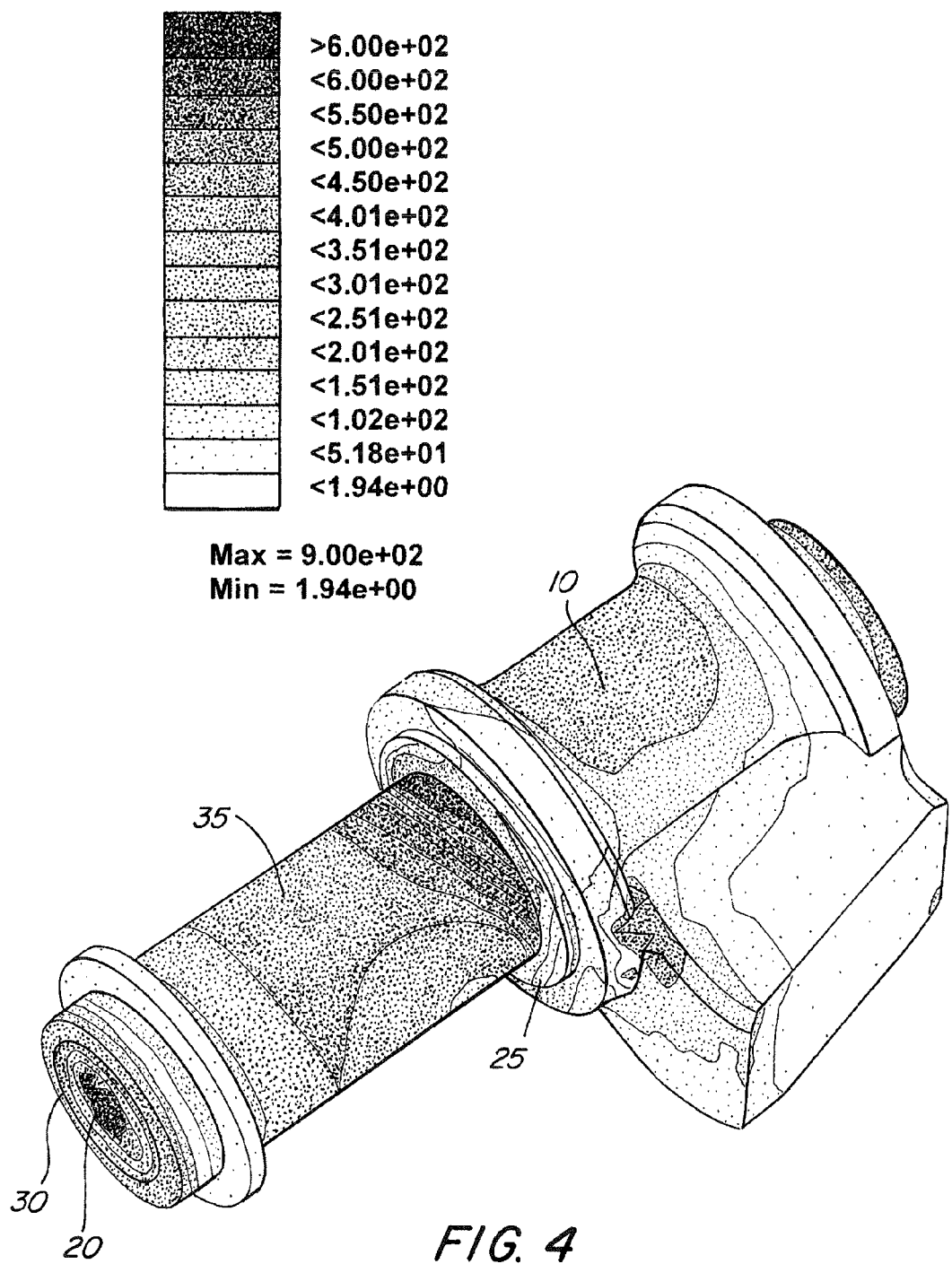
FIG. 4 is a stress diagram of an illustrative embodiment of an offset bushing and suspension component.

The embodiments depicted in FIGS. 4-7 show stress distributions measured in one embodiment of the offset bushing and suspension component assembly, wherein a force F of 33.2 kN is being subjected to the bushing, as typically experienced in automotive or light truck applications. FIG. 4 depicts the stress distribution throughout the entire structure. FIG. 5 depicts the stress distribution to the structure without showing the rigid collar 35. FIG. 6 depicts the stress distribution to the structure without showing the rigid collar 35 and stud 20. FIG. 7 depicts stress distribution in the suspension component 10 without showing the rigid collar 35, the stud 20, and the hardened sleeve 17. As depicted in FIG. 7, a measurable reduction in the stress induced to the suspension component 10 may be provided by the hardened sleeve 17 and offset bushing assembly, wherein a reduction in stress to less than 300 MPa at the connection 100 of the bushing 15 to the suspension component 10 allows for the use of lightweight aluminum alloy suspension components in an advantageous manner, such as an economical manner.

Figure 8:
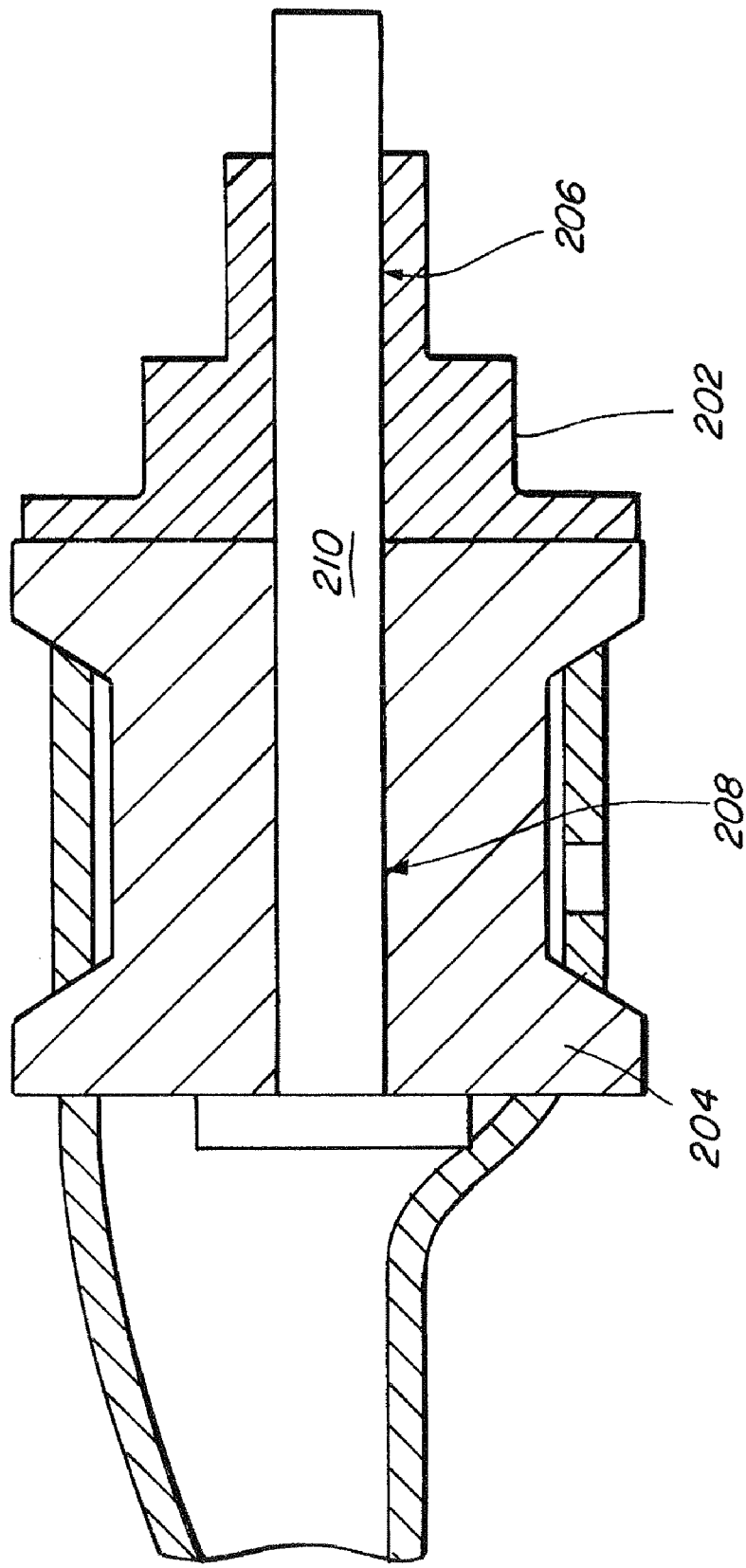
FIG. 8 is a cross-sectional view of an illustrative embodiment of an offset suspension bushing.

As shown in the embodiments depicted in FIG. 8, a sleeve 202 may be used to transmit a load from a bushing (not shown) to a suspension component, which may contain or may be rigidly affixed to a boss 204. The sleeve 202 may be a stepped, hardened steel sleeve and may be designed to withstand high stresses without permanent deformation or fracture. The sleeve 202 may be designed to spread out the load from the bushing to a large contact area of the suspension component or boss 204. The boss 204 may be formed separately from or integrally with the sleeve 202. In some embodiments, the boss 204 is made from cast aluminum. The boss 204 may be aligned with the sleeve 202 to enable a bolt 210 to be inserted through bores 206, 208 of the sleeve 202 and boss 204, respectively. The bolt 210 may be threaded into a fastener, such as a nut (not shown), on the outside of the bushing inner sleeve to hold the bolt 210 in place. This configuration may clamp the bushing inner metal and sleeve 202 to the boss 204, thereby contributing to proper load transfer through frictional forces. Stresses acting on the boss 204, for example stresses due to service loading, may be effectively reduced such that a lower-strength material can now be utilized and may withstand repeated application of the service load. An exemplary stress distribution is represented in the embodiment shown in FIG. 9.

In some embodiments, an adaptor or connector may be utilized to transmit a load from a bushing to a suspension component, similar to the sleeve 202 of the previous embodiment. As shown in the embodiment depicted in FIG. 9, a cantilever bushing joint 220 may include a boss 222 and a bushing 224 connected to the boss via an adaptor 226. The bushing 224 may be press fit or interference fit onto the adaptor 226. The adaptor 226 may connect with the boss 222 via a contact surface 228.

The contact surface 228 may be formed in mushroom or convex shape, which may improve stress distribution for the contact surface 228 between the adaptor 226 and the suspension component or the boss 222. A contact surface with a mushroom shape may also limit and resist slippage between the adaptor and the suspension component. In some embodiments, the adaptor 226 is made of a material which can withstand high stresses without significant or any deformation, similar to a steel sleeve 202 as described above.

A bolt 230 may be inserted through bores of the boss 222, adaptor 226 and bushing 224. The bolt 230 may be secured in place using any means, such as a nut 232 or other fastener positioned a distal end 234 of the bushing 224. In some embodiments, the nut 232 may be threaded onto the steel bolt 230 outside of the bushing inner sleeve, which may clamp the bushing inner metal and adaptor to the suspension component, assisting in attaining proper load transfer through frictional forces. The stresses acting on the suspension component due to the service loading may be effectively reduced such that a lower-strength material can now be utilized, and may withstand repeated application of the service load. An exemplary stress distribution is represented in the embodiment shown in FIG. 11.

Figure 10:
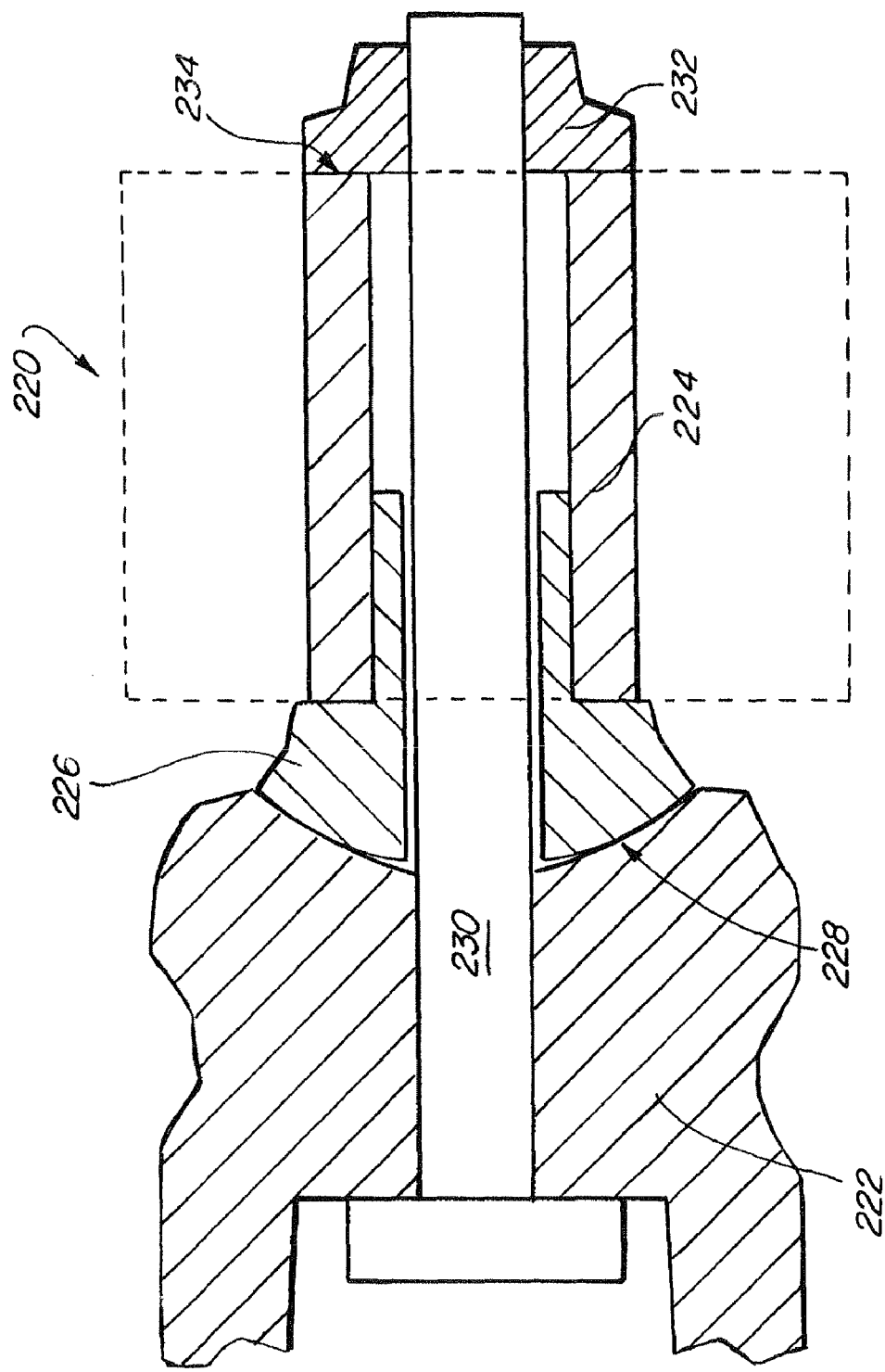
FIG. 10 is a cross-sectional view of an illustrative embodiment of an offset suspension bushing.
Figure 12:
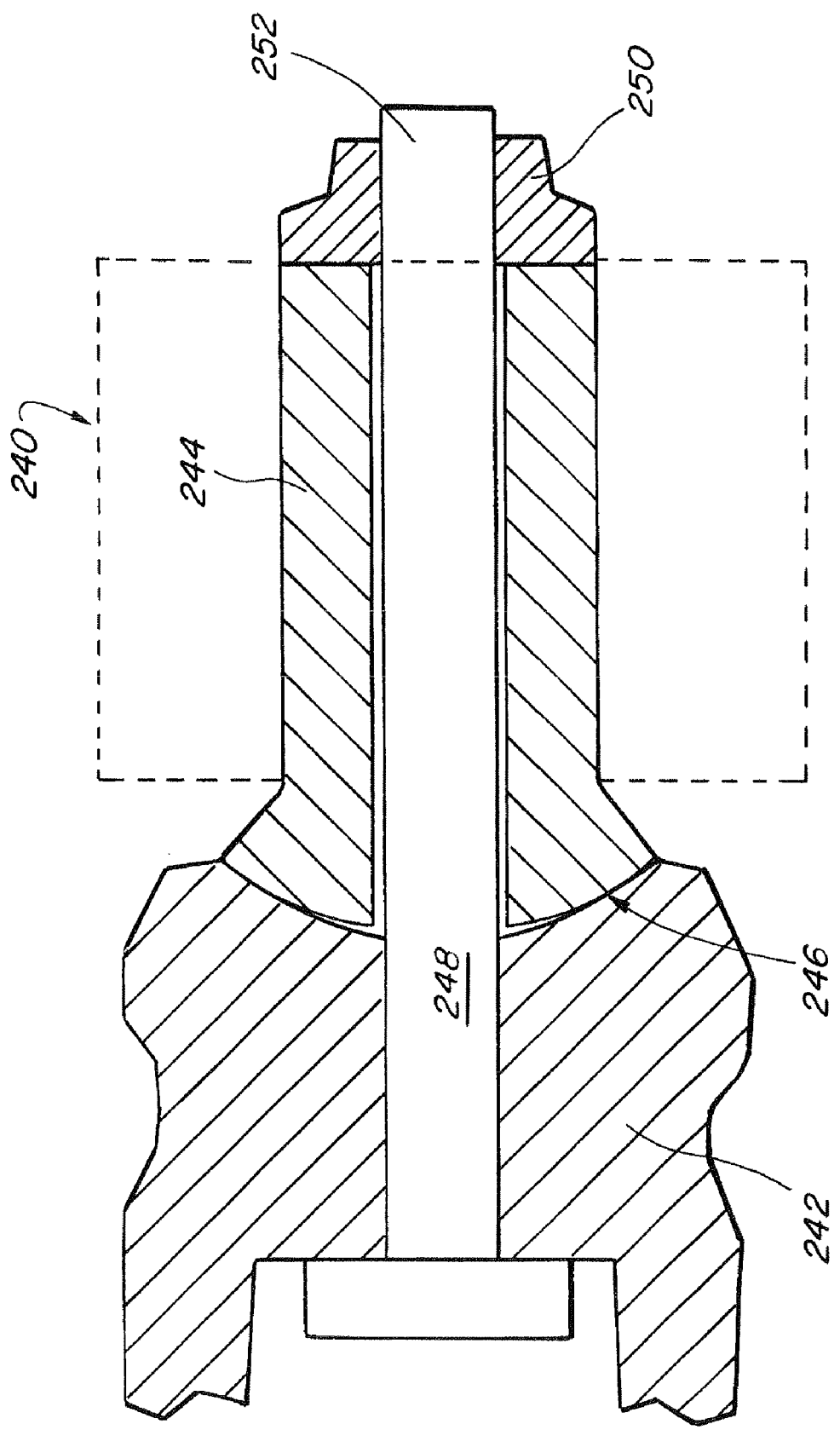
FIG. 12 is a cross-sectional view of an illustrative embodiment of an offset suspension bushing; and, FIG. 13 is a stress diagram of the offset suspension bushing of FIG. 12.

In some embodiments, the adaptor portion may be combined with the bushing inner sleeve, as shown in the embodiment depicted in FIG. 12. The cantilever bushing joint 240 may include a boss 242 and an integrated bushing sleeve 244. The integrated bushing sleeve 244 may be designed to transmit a load from the bushing to the suspension component or the boss 242, similar to the steel sleeve 202 of FIG. 8. The contact surface 246 may be formed in a mushroom shape, which may better distribute stress between the bushing and the suspension component. As described above, the bushing sleeve may be made of a material which can withstand high stresses without significant or any deformation. In some embodiments, a steel bolt 248 may be secured by a nut 250 threaded onto a distal end 252 of the steel bolt 148. An exemplary stress distribution is represented in the embodiment shown in FIG. 13. In some embodiments having an integrated bushing sleeve, the bushing inner metal may be made of a similar or the same high yield strength material as the adaptor 226 of the embodiment depicted in FIG. 10; this material may be needed to withstand service-induced stresses.

It should be appreciated that interference fit or press fit may imply that one part is pressed into another part to hold the first part in place. In some embodiments, the first part may have a bigger diameter than an opening in the second part into which the first part is inserted. When the first part is inserted or forced into the opening in the second part, the second part may deform to accommodate the first part. This deformation may be microscopic or visible with the naked eye. The first part may then be held by frictional forces caused by the normal forces of the second part trying to return to its original shape. In other words, the elastic deformation of the second part may hold the first part in place by substantial frictional force between the parts.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A service load bearing assembly, comprising:
    a load distribution assembly comprising an offset bushing having a bushing contact area that (i) serves as a bushing for a service load between a pivot axis component and a suspension component, (ii) mates with a suspension component contact area, and (iii) functions to spread-out the service load from the bushing, through the bushing contact area, and onto the suspension component contact area;
    wherein,
    the pivot axis component has a yield strength that is at least 2 times higher than a yield strength of the suspension material;

the suspension component comprises a suspension material, the suspension component having a geometry for insertion of at least a first portion of the pivot axis component; and the bushing is offset from the suspension component contact area through the load distribution assembly such that a stress induced by the service load is spread out to an amount that is at or below the yield strength of the suspension component.

2. The assembly of claim 1, wherein the suspension material has a component selected from the group consisting of aluminum, aluminum alloys, magnesium, magnesium alloys, low yield strength steel, iron, and low yield strength materials having a yield strength of at least about 100 MPa and about 300 MPa.

3. The assembly of claim 1, wherein the yield strength of the pivot axis component is at least three times higher than the yield strength of the suspension component.

4. The assembly of claim 1, wherein the yield strength of the pivot axis component is between about 600 MPa and about 1000 MPa and the yield strength of the suspension component is between about 100 MPa and about 300 MPa.

5. The assembly of claim 1, wherein the pivot axis component comprises a high strength steel or titanium and the suspension component comprises aluminum, aluminum alloy, magnesium, magnesium alloy, a low strength steel or iron.

6. The assembly of claim 1, wherein the pivot axis component material is a high strength steel and the suspension component material is an aluminum alloy.

7. The assembly of claim 1, wherein the load distribution assembly has a bushing assembly that includes an adaptor and a bushing sleeve, the adaptor being arranged to contact the suspension component.

8. The assembly of claim 7, wherein the bushing sleeve comprises an elastomeric material.

9. The assembly of claim 1, wherein the bushing contact area has a mushroom or convex shape.

10. The assembly of claim 1, wherein the load distribution assembly comprises a hydraulic bushing.

11. A suspension assembly, comprising:
 a pivot axis component comprising a material having a component selected from the group consisting of a high yield strength steel, titanium, and a high yield strength material having a yield strength greater than about 600 MPa;
 a suspension component comprising a suspension material, the suspension component having a suspension opening therethrough, and the suspension opening having a geometry for insertion of at least a first portion of the pivot axis component, the suspension material having a component selected from the group consisting of aluminum, aluminum alloys, magnesium, magnesium alloys, low yield strength steel, iron, and low yield strength materials having a yield strength between about 100 MPa and about 300 MPa; and,
 a load distribution assembly comprising an offset suspension bushing having a bushing contact area that (i) serves as a bushing for a service load between the pivot axis component and the suspension component, (ii) mates with a suspension component contact area, and (iii) functions to spread-out the service load from the bushing, through the bushing contact area, and onto the suspension component contact area;
 wherein,
 the pivot axis component has a yield strength that is at least 2 times higher than a yield strength of the suspension material; and the bushing is offset from the suspension component contact area through the load distribution assembly such that a stress induced by the service load is spread out to an amount that is at or below the yield strength of the suspension component.

12. The suspension assembly of claim 11, wherein the yield strength of the pivot axis component is at least three times higher than the yield strength of the suspension component.

13. The suspension assembly of claim 11, wherein the yield strength of the pivot axis component is between about 600 MPa and about 1000 MPa and the yield strength of the suspension component is between about 100 MPa and about 300 MPa.

14. The suspension assembly of claim 11, wherein the pivot axis component material is a high strength steel and the suspension component material is an aluminum alloy.

15. The suspension assembly of claim 11, wherein the load distribution assembly has a bushing assembly that includes an adaptor and a bushing sleeve, the adaptor being arranged to contact the suspension component.

16. The suspension assembly of claim 15, wherein the bushing sleeve comprises an elastomeric material.

17. The suspension assembly of claim 11, wherein the bushing contact area has a mushroom or convex shape.

18. The suspension assembly of claim 11, wherein the load distribution assembly comprises a hydraulic bushing.

19. A suspension assembly comprising:
 a suspension component including at least one cylindrical or substantially cylindrical cavity positioned at one end of the suspension component, the cylindrical cavity providing for attachment to a vehicle frame and having a bore surface at one end of the cylindrical cavity;
 a pivot axis component positioned centrally in the at least one cylindrical or substantially cylindrical cavity, the pivot axis component (i) having a head surface that is opposed to the bore surface of the cylindrical cavity of the suspension component and (ii) providing a pivot axis for the suspension component when attached to the vehicle frame through a bushing comprising an elastomeric element and a rigid core with a centrally positioned hollow; and,
 a hardened sleeve in a pressed interference-fit engagement with the bore of the cylindrical cavity and having a first contact area for applying a load on the suspension component from the bushing, such that a stress induced by the service load is spread out to an amount that is at or below the yield strength of the suspension component;
 wherein,
 the elastomeric element having the rigid core with the centrally positioned hollow and a second contact area for applying the load to the hardened sleeve, wherein the hollow of the rigid core has a geometry for insertion of the pivot axis component;
 wherein, the first contact area is larger than the second contact area; and,
 the concentrated stress is reduced to an amount that is at or below the yield strength of the suspension component.

20. The suspension assembly of claim 19, wherein the yield strength of the pivot axis component is at least three times higher than the yield strength of the suspension component.

21. The suspension assembly of claim 19, wherein the yield strength of the pivot axis component is between about 600 MPa and about 1000 MPa and the yield strength of the suspension component is between about 100 MPa and about 300 MPa.

22. The suspension assembly of claim 19, wherein the pivot axis component is a high strength steel and the suspension component is an aluminum alloy.

23. The suspension assembly of claim 19, wherein the load distribution assembly has a bushing assembly that includes an adaptor and a bushing sleeve, the adaptor being arranged to contact the suspension component.

24. The suspension assembly of claim 19, wherein the first contact area has a mushroom or convex shape.

* * * * *